(12) United States Patent
Keller et al.

(10) Patent No.: US 8,277,527 B2
(45) Date of Patent: Oct. 2, 2012

(54) AIR FILTER UNIT

(75) Inventors: Sven Keller, Berglen (DE); Harald Bühner, Rudersberg (DE); Christoph Maschke, Börtlingen (DE); Armin Kölmel, Rottenburg (DE); Andreas Weisshaar, Weinstadt (DE); Konrad Knaus, Gaildorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 333 days.

(21) Appl. No.: 12/656,473

(22) Filed: Feb. 1, 2010

(65) Prior Publication Data

US 2010/0192901 A1 Aug. 5, 2010

(30) Foreign Application Priority Data

Jan. 30, 2009 (DE) .......................... 10 2009 006 899

(51) Int. Cl.
*B01D 46/00* (2006.01)
*F02M 17/34* (2006.01)

(52) U.S. Cl. ............. 55/320; 55/327; 55/385.3; 55/413; 55/414; 55/DIG. 28; 123/198 E

(58) Field of Classification Search ............... 55/320, 55/321, 325, 326, 327, 385.3, 413, 414, 464, 55/DIG. 28; 123/198 E
See application file for complete search history.

(56) References Cited

U.S. PATENT DOCUMENTS

| 5,582,146 A | * | 12/1996 | Linsbauer et al. ......... 123/198 E |
| 6,454,823 B2 | * | 9/2002 | Fries et al. ................... 55/385.3 |
| 6,752,846 B2 | * | 6/2004 | Rotter et al. ................. 55/385.3 |
| 2001/0025471 A1 | * | 10/2001 | Fries et al. ....................... 55/320 |

FOREIGN PATENT DOCUMENTS

JP 2001289131 A * 10/2001

* cited by examiner

*Primary Examiner* — Duane Smith
*Assistant Examiner* — Sonji Turner
(74) *Attorney, Agent, or Firm* — Walter Ottesen

(57) ABSTRACT

An air filter unit (1) for a carburetor (2) of a portable handheld work apparatus includes a filter element (3) and at least one clean air channel (10, 11) arranged between the filter element (3) and the carburetor (2). At least one condensation rib (29, 30, 31, 32) is arranged in the clean air channel (10, 11) running in flow direction.

17 Claims, 3 Drawing Sheets

US 8,277,527 B2

AIR FILTER UNIT

CROSS REFERENCE TO RELATED APPLICATION

This application claims priority of German patent application no. 10 2009 006 899.6, filed Jan. 30, 2009, the entire content of which is incorporated herein by reference.

FIELD OF THE INVENTION

The invention relates to an air filter unit for a carburetor of a portable handheld work apparatus.

BACKGROUND OF THE INVENTION

Portable handheld work apparatus driven by an internal combustion engine include a carburetor for the generation of an air/fuel mixture. An air filter unit for filtering inducted combustion air is mounted on the inflow end of the carburetor. The filter element includes a filter base which is mounted at the carburetor and is connected to the intake end of the carburetor with threaded fasteners. A suction opening is disposed in the filter base and this suction opening communicates with the intake channel of the carburetor. The filter base extends transversely to the longitudinal axis of the suction opening and, in accordance with the state of the art, is provided with a sealing surface at its end facing away from the carburetor. A filter element with a peripherally-extending seal lies against this sealing surface. A clean air side of the air filter unit is formed with a clean air channel because of the filter element, the peripherally-extending sealing ring and the filter base. The carburetor draws filtered combustion air from the clean air channel.

Air filter units of this kind have additional tasks which go beyond the strict filter function. These tasks are grounded in the special performance of single-cylinder two-stroke engines or four-stroke engines used in portable handheld work apparatus.

During operation, the intake air flow is not continuous but pulsates in dependence upon the control times of the internal combustion engine. For a satisfactory running performance, a match of the length of the induction path to the operating rpm of the engine is sought. With a suitable length selection, the pressure pulsations, which occur in the intake path, can be utilized to support the cylinder charge. In conventional constructions, this leads to a large axial structural length which is unwanted in portable handheld work apparatus. The filter element must be arranged at a large distance to the carburetor or to the cylinder of the engine with an axial length adaptation of the intake channel. In contrast, a convenient configuration of the work apparatus with a small volume outer contour is sought so that only limited structural space is available for the length adaptation of the intake path.

The above-described pressure pulsations in the intake channel furthermore lead at low and mid rpms to an effect which is characterized as "back spitting". Here, during induction, fuel is indeed drawn by suction into the carburetor but is not completely conducted into the cylinder. A back running pressure wave pushes a part quantity of the fuel opposite to the intake direction from the carburetor in the direction of the air filter. This can lead to unwanted collections of fuel and to a wetting of the filter element with fuel or the like. To avoid this problem, arrangements are known with back scattering walls or impact pots which are intended to protect the filter element against back-spat fuel. Here too, the problem of unwanted large axial structural length occurs.

SUMMARY OF THE INVENTION

It is an object of the invention to improve the air filter unit described above so that intake performance and back spitting performance are improved.

The air filter unit of the invention is for a carburetor of a portable handheld work apparatus. The air filter unit includes: a filter element; a clean air channel defining a flow direction and being arranged between the filter element and the carburetor; and, a condensation rib arranged in the clean air channel so as to extend in the flow direction.

An air filter unit is provided wherein at least one condensation rib is arranged in the clean air channel running in flow direction. Preferably, two condensation ribs are mounted one next to the other in a clean air channel. In contrast to the known impact walls, no flow deflection or even a flow throttling is introduced. Rather, the flow lines of the intake air flow remain essentially uninfluenced by the condensation ribs. The condensation ribs, however, increase the surface which is stroked over by the intake air flow so that larger back-spat fuel quantities can be deposited. The formation of fuel puddles or even a back spitting to the filter element is reliably avoided.

In a further embodiment, at least one condensation rib has a hold-back edge for condensed fuel on its lower end. This condensation rib lies downwardly in the direction of gravitational force referred to the usual work holding position. Fuel, which deposits on the surface of the condensation rib and is not immediately again entrained by the stroking air flow, runs downwardly as a consequence of the action of gravity. At the lower end of the condensation rib, the fuel cannot, however, simply drip off in droplets and form unwanted puddles because its flow is restricted by the hold-back edge. At the same time, the hold-back edge operates as a rip-off edge for the passing stroking air flow. The eddy flows generated in this way improve the take up capacity of the intake air flow for the fuel collected in the region of the hold-back edge.

In a preferred embodiment, the cross section of the clean air channel narrows starting from the filter element and extending toward the carburetor. The at least one condensation rib is mounted in the narrowing channel segment. The condensation rib lies in a region of accelerated air flow whereby the taking up again of the deposited fuel into the intake air flow passing through is improved.

In an advantageous further embodiment of the invention, two separate clean air channels having especially different lengths are provided. With the arrangement of two separate channels, the flow guidance is optimized with maximum usage of the structural space available. An adaptation of the rpm over a wider rpm range can be achieved with the selection of two different lengths. Each of the two clean air channels can be provided with one or several condensation ribs whereby the back spitting performance is further improved.

It is advantageous to mount a filter base at the carburetor end of the filter element in combination with the above features or even as an independent invention. The filter base has a suction opening defining a longitudinal axis. An intermediate base is arranged between the filter element and the filter base. The filter base and the intermediate base extend in a plane lying transversely to the longitudinal axis. The filter element lies against a sealing surface of the intermediate base with a peripherally-extending seal. The intermediate base in the plane is larger than the peripherally-extending seal of the filter element. The at least one clean air channel is arranged between the filter base and the intermediate base and opens into the suction opening. A center line of the clean air channel runs in the above-mentioned plane.

The clean air channel defines an extension of the flow path between the filter element and the carburetor. The center line of the clean air channel runs in the plane transversely or perpendicularly to the longitudinal axis of the suction opening. For this reason, the need for space in the direction of the longitudinal axis becomes limited to the required channel thickness. The filter element lies with its peripherally-extending seal not on the filter base but on the intermediate base and furthermore, the filter base is larger in its plane than the filter element. For this reason, there is adequate structural space for a longer clean air channel by means of which an intake path can be adjusted which is adapted to the pulsating suction performance of especially the single-cylinder internal combustion engine without the axial structural length of the arrangement being increased by a corresponding amount.

The intermediate base furthermore protects the filter element against back-spat fuel. Channel walls of adequate lengths are formed by means of the clean air channel so that, on these walls, back-spat fuel can deposit or condense. This deposited fuel is then either drawn in anew or conducted away in another manner so that it does not come into contact with the filter element. Overall, in the direction of the longitudinal axis of the suction opening, there results a compact structural shape of the air filter unit which improves the running performance of the engine via an adapted intake path and via effective protection against back spitting.

In a preferred embodiment, the filter base and the intermediate base extend in the above-mentioned plane in an up direction with a height and in a lateral direction with a width. A wall of the filter base and a wall of the intermediate base lie essentially mutually parallel to the above-mentioned plane and have a spacing with respect to each other. The height and the width are greater and especially twice as large, preferably at least three times as large as the above-mentioned spacing. In this way, a flat channel case is formed wherein the clean air channel is arranged. The flat construction reduces the need for axial structural volume whereas the comparatively large height and width provide adequate space for a correspondingly long configuration of the clean air channel.

Preferably, the clean air channel is redirected several times in the plane of the filter base and the intermediate base. On the one hand, the length of the clean air channel can hereby be increased without the width or the height of the channel case becoming too large. On the other hand, the multiple redirections favor a deposit or condensation of the back-spat fuel so that it can be more easily returned or collected.

Advantageously, the intermediate base has a wall section which lies opposite the suction opening referred to the longitudinal axis thereof. The above-mentioned wall section functions as an impact wall for back-spat fuel. In this way, the deposit of the back-spat fuel is initiated already close to the suction opening.

In a preferred embodiment, a wall tongue having a lower end in the direction of gravity is provided referred to the usual work position. The clean air channel is guided around the lower end of the wall tongue. The lower end of the wall tongue is provided with at least one hold-back edge for condensed fuel. For this purpose, the same applies as described in connection with the condensation rib. The dripping off of fuel droplets is prevented. At the same time, the take up capacity of the intake air flow is improved for condensed fuel because of the generated eddy formation.

Preferably, a wall section of the clean air channel, which is lower in the direction of gravitational force, has a breakthrough to a fuel collection space. This arrangement is based on the consideration that not all fuel which is spat back can be again supplied to the intake air flow under all operating conditions. Remaining residual amounts of fuel then drip downwardly in the direction of gravitational force and are collected in the fuel collection space. In this way, the problem is reduced that fuel reaches the filter via the clean air channel.

In a preferred embodiment, the clean air channel has a filter end input window. A connection space for tank venting is provided next to the inlet window. The connecting space is in a flow-conducting connection to the clean air channel. The tank venting can, in this way, take place via the clean side of the filter without the filter being affected by back-spat fuel.

In a preferred embodiment, a condensation rib extends into a channel wall in the overlap region with the suction opening and there has an outflow window facing toward the suction opening. In this way, and comparable to a cul-de-sac, a part segment is branched off from the clean air channel. The intake air flow passing through is, however, not backed up; it is instead supplied to the suction opening via the outflow window. This makes possible an optimization of the course of flow during passage through the suction opening.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
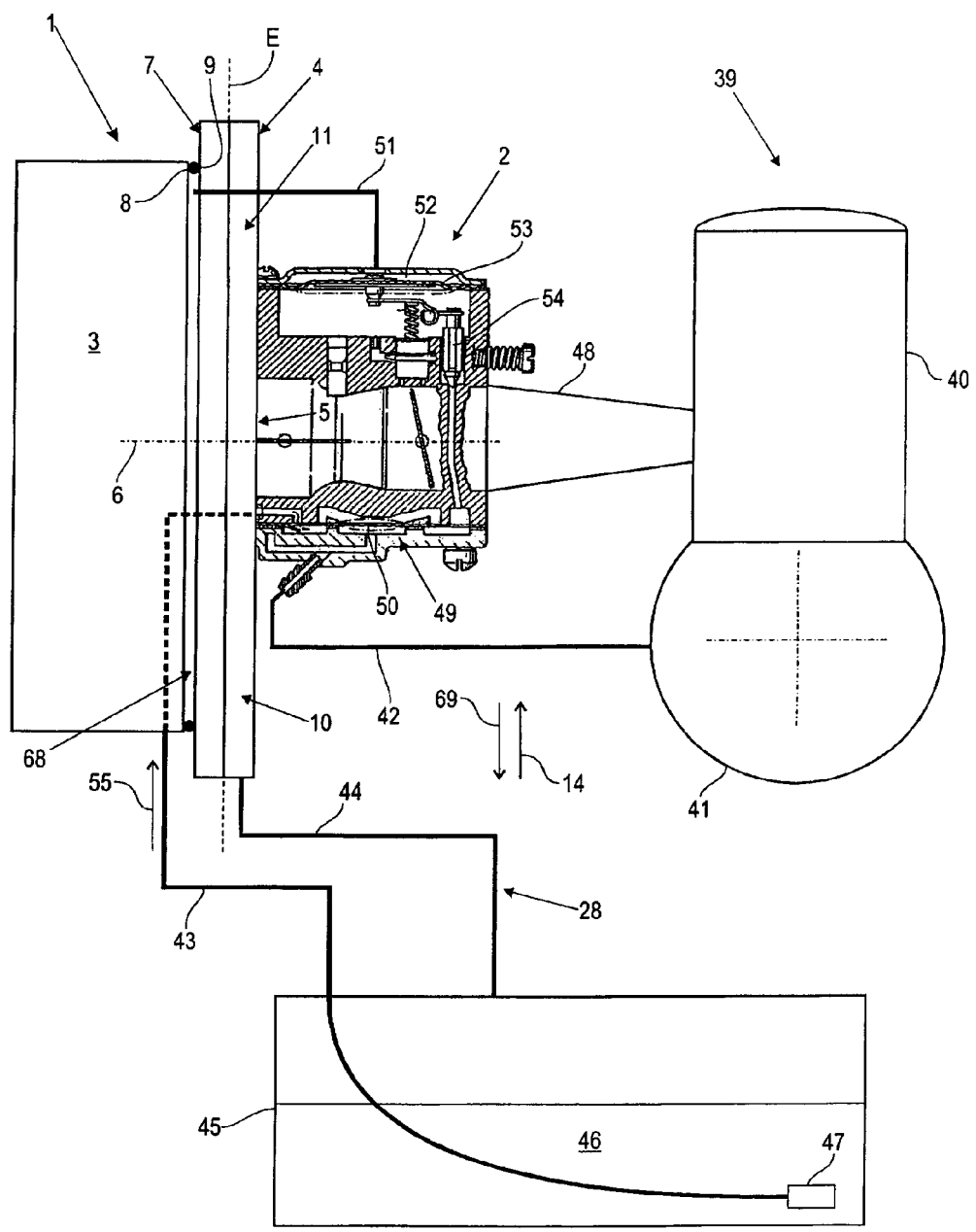
FIG. 1 is a schematic diagram showing an air filter unit interacting with a carburetor of a single-cylinder internal combustion engine.

FIG. 1 shows a schematic diagram of an air filter unit 1 according to the invention in interaction with a carburetor 2 of an internal combustion engine 39. The arrangement is part of a portable handheld work apparatus (not shown in greater detail) which is driven by the engine 39. The work apparatus is especially a chain saw, a brushcutter, a suction/blower apparatus or the like which is driven by the engine 39. The engine 39 is a single-cylinder two-stroke engine or four-stroke engine and includes a cylinder 40 having a crankcase 41.

A carburetor 2 is provided for supplying the cylinder 40 with an air/fuel mixture. An intake channel 48 passes through the carburetor 2 and opens into the cylinder 40 for feeding the air/fuel mixture. The air filter unit 1 is mounted on the input end of the carburetor 2 lying opposite to the cylinder 40 and includes a filter element 3, a filter base 4 and an intermediate base 7. The filter base 4 is mounted directly on the end face of the carburetor 2 with threaded fasteners and has a suction opening 5 defining a longitudinal axis 6. The suction opening 5 is described in greater detail hereinafter and is in overlapment with the intake channel 48 which passes through the carburetor 2. The longitudinal axis 6 of the suction opening 5 is coincident with the longitudinal axis of the intake channel section lying in the carburetor 2.

A plane E is defined lying perpendicular to the longitudinal axis 6. The filter base 4 extends in this plane E or parallel thereto. A filter element 3 is mounted on the end side of the filter base 4 facing away from the carburetor 2. The filter element 3 is preferably configured as a flat-folded filter and has a peripherally-extending seal 8 on its side facing toward the filter base 4 and the carburetor 2. An intermediate base 7 is arranged between the filter element 3 and the filter base 4 which, like the filter base 4, extends transversely to the longitudinal axis 6 in the plane E or parallel thereto. Referred to the plane E, the filter base 4 and the intermediate base 7 are larger than the filter element 3 or the peripherally-extending contour of its seal 8. Accordingly, the filter element 3 is not in direct contact with the filter base 4; instead, the filter element 3 lies with its peripherally-extending seal 8 against a sealing surface 9 of the intermediate base 7. The sealing surface 9 is likewise peripherally extending and faces toward the filter element 3. A clean air side 68 results on the carburetor side of the filter element 3 and is delimited by the filter element 3 and the peripherally-extending seal 8. The carburetor 2 takes the filtered intake air from the clean air side 68. At least one and here two clean air channels (10, 11) are arranged between the filter base 4 and the intermediate base 7. The clean air channels (10, 11) are described in greater detail hereinafter and open into the suction opening 5 and establish a flow conducting connection between the clean air side 68 and the carburetor 2.

Fuel 46 is stored in a fuel tank 45. The carburetor 2 is provided with a membrane pump 49 having a membrane 50 for drawing the fuel 46 by suction from the tank 45. The membrane pump 49 is connected for pressure transmission to the crankcase 41 of the engine 39 via a pressure line 42. The membrane 50 is charged with pulsating pressure via the pressure line 42. The pulsating pressure is generated in the crankcase 41. As a consequence of the pulsating membrane movement, fuel 46 is drawn by suction via the flutter valve formed in the membrane 50 and not shown here in greater detail. The fuel 46 drawn in by suction is moved into the carburetor 2 to form the air/fuel mixture. For this purpose, a fuel line 43 is provided which is connected at its one end to the membrane pump 49 and, at its opposite-lying end, to a suction head 47 lying in the fuel tank 45. The suction head 47 lies below the surface of the fuel 46 because of its inherent weight whereby fuel is pumped from the fuel tank 45 to the membrane pump 49 in correspondence to arrow 55 and from the membrane pump 49 into the intake channel 48. To compensate for volume fluctuations in the fuel tank 45, a tank vent 28 is provided which establishes a connection between the fuel tank 45 and the filter base 4 via a venting line 44 as will be described hereinafter.

The carburetor 2 has a needle valve 54 for controlling the fuel flow in the carburetor 2. The needle valve 54 is actuated via a control membrane 53. A closed compensation space 52 is arranged on the outer side of the control membrane 53 and this compensation space 52 is in a pressure-transmitting connection to the clean air side 68 of the air filter unit 1 via a compensating line 51. The compensating line 51 is passed through the filter base 4 and the intermediate base 7 without there being a direct connection to the clean air channels (10, 11) arranged there. The control membrane 53 is charged on its outer side or in the compensation space 52 with air pressure which is present at the clean air side 68.

The arrangement of FIG. 1 is shown in its usual work position wherein an up direction 14 fixed with respect to the apparatus lies opposite the direction of gravity indicated by arrow 69. The up direction 14 lies parallel to the plane E.

Figure 2:
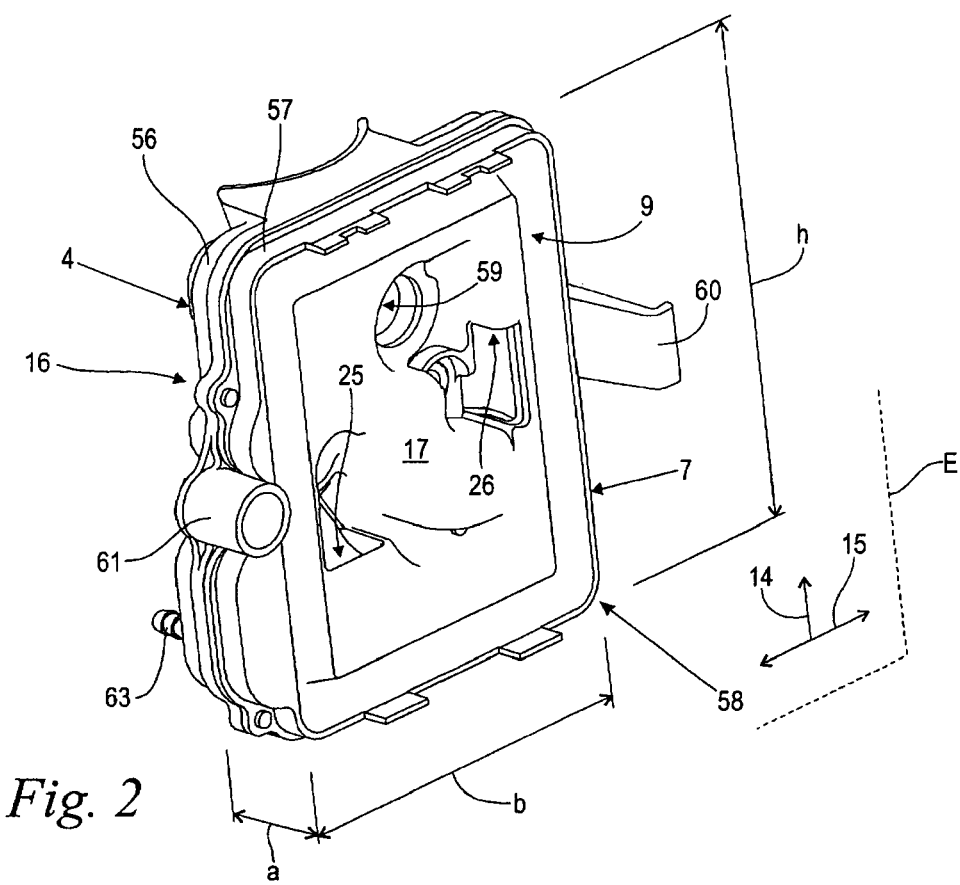
FIG. 2 is a perspective view showing a channel case of the air filter unit of FIG. 1 formed by a filter base and an intermediate base with the channel case showing details of the geometric configuration.

FIG. 2 shows a perspective view of a component which is formed by the filter base 4 and the intermediate base 7 of FIG. 1. The intermediate base 7 is in the form of a flat dish and includes a wall 17 lying parallel to the plane E. The wall 17 has a peripherally-extending edge and a likewise peripherally-extending peripheral wall 57 extending therefrom to form the above-mentioned dish shape. The peripheral wall 57 faces toward the filter base 4. In this context, the filter base 4 is configured in a comparable manner. The filter base 4 includes a wall 16 shown in greater detail in FIG. 3. The wall 16 likewise lies parallel to the plane E and has an outer peripherally-extending edge. A peripherally-extending peripheral wall 56 extends from this outer edge of wall 16. The filter base 4 and the intermediate base 7 are connected pressure tight to each other at their peripheral walls (56, 57) whereby a closed channel case 58 is formed for accommodating the clean air channels (10, 12) shown in FIGS. 1, 3 and 4.

The peripheral walls (56, 57) conjointly define a spacing (a) between the walls (16, 17) which lie essentially parallel to each other. Furthermore, the walls (16, 17) extend in the up direction 14 at an elevation or height (h). A lateral direction 15 is provided which is fixed with respect to the apparatus and lies perpendicular to the up direction 14 and parallel to the plane E. The walls (16, 17) and therefore the filter base 4 and the intermediate base 7 extend in the lateral direction with a width (b). The elevation (h) and the width (b) are greater than the distance (a) between the walls (16, 17). Preferably, the elevation (h) and the width (b) are at least twice as large as the distance (a). In the embodiment shown, they are least three times as large as the distance (a).

FIG. 2 shows that a peripherally-extending groove is formed in the wall 17 of the intermediate base 7 at its outer edge. This groove forms the sealing surface 9 for the seal 8 of the filter element 3 (FIG. 1) and accommodates the seal 8. Furthermore, the wall 17 has two inlet windows (25, 26) for the clean air channels (10, 11). The two inlet windows (25, 26) will be explained in greater detail hereinafter. The combustion air is drawn in from the clean air side 68 (FIG. 1) and flows through the inlet windows (25, 26) into the clean air channels (10, 11) as shown in FIGS. 3 and 4.

Furthermore, a hook 60 as well as a threaded-fastener dome 61 are provided on filter base 4. The threaded-fastener dome 61 lies opposite in the wide direction and is provided for attaching a filter housing (not shown). FIG. 2 also shows that a compensator passthrough 59 extends through the entire channel case 58 and is provided for passing through the compensator line 51 of FIG. 1.

Figure 3:
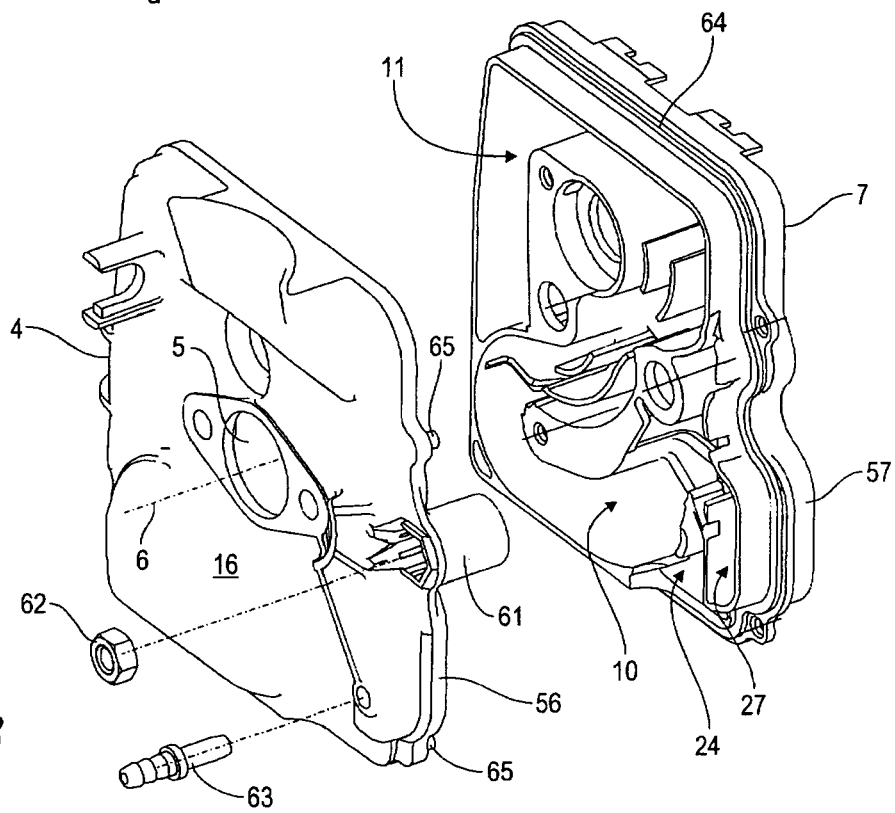
FIG. 3 is an exploded view of the arrangement of FIG. 2 showing details as to the internal configuration of the intermediate base.
Figure 4:
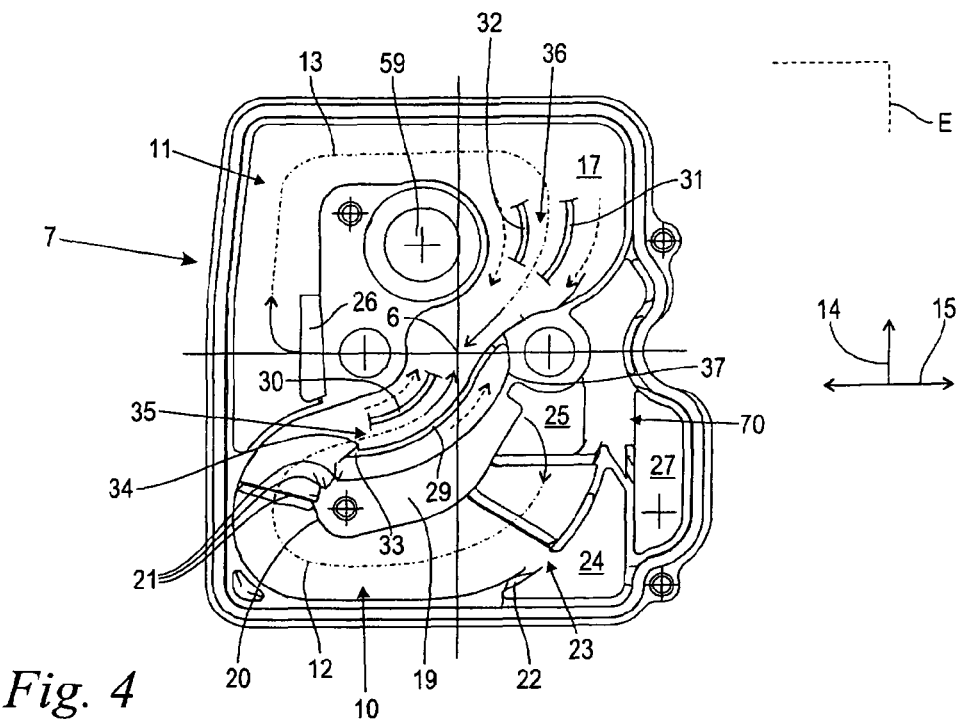
FIG. 4 is a plan view of the intermediate base of FIG. 3 showing details for the arrangement of condensation ribs in the clean air channels and the flow pattern generated thereby; and, FIG. 5 shows the arrangement of FIG. 4 with the filter base seated in place and showing further details in the region of the suction opening.

FIG. 3 shows the arrangement of FIG. 2 in a perspective illustration viewed from the side of the filter base 4. The following are formed on the inner side of the dish-shaped base 7: two clean air channels (10, 11), a connection space 27 for the tank venting 28 (FIG. 1) and a fuel collection space 24. A sealing surface 64 is provided on the peripheral wall 57 of the intermediate base 7. The peripheral wall 56 of the filter base 4 lies seal tight against the sealing surface 64 in the assembled state. For mutual alignment of filter base 4 and intermediate base 7, the filter base 4 has centering lugs 65 which engage in corresponding openings of the intermediate base 7.

The above-described suction opening 5 with its longitudinal axis 6 is formed in the wall 16 of the filter base 4. It is noted that the longitudinal axis 6 is essentially perpendicular to the wall 16 of the filter base 4. A nut 62 is provided as an insert part for the threaded-fastener dome 61 in order to facilitate a threaded connection with the above-mentioned filter housing (not shown). Furthermore, a threaded nipple 63 is threadably engaged in the wall 16 of the filter base 4 lying opposite to the connecting space 27. In the assembled state, the venting line 44 (FIG. 1) is pushed onto the threaded nipple 63 thereby establishing a flow-conducting connection of the fuel tank 45 (FIG. 1) to the connecting space 27.

Figure 5:
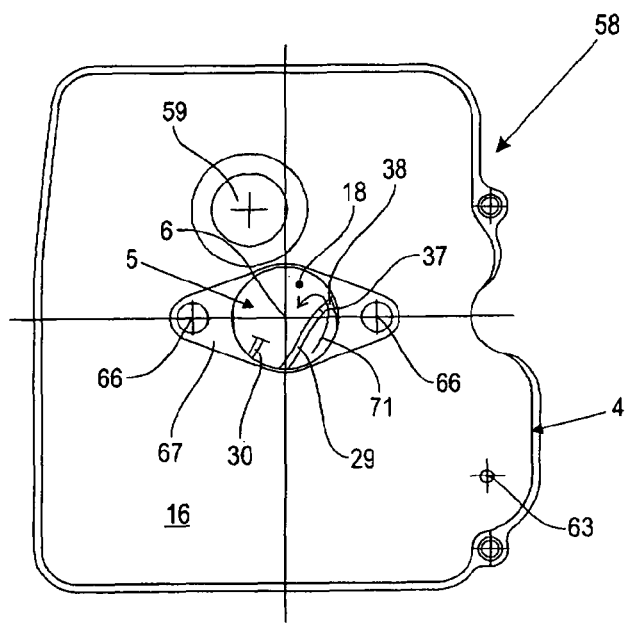

FIG. 4 shows an inside plan view of the side of the intermediate base 7 facing toward the filter base 4. Two clean air channels (10, 11) are formed in the intermediate base 7 which run from the inlet windows (25, 26) assigned thereto along respective center lines (12, 13) to the region pregiven by the longitudinal axis 6 of the suction opening 5 (FIGS. 3, 5). The curved center lines (12, 13) run in the up direction 14 and the lateral direction 15 and therefore lie in the plane E or parallel thereto. The two clean air channels (10, 11) have different lengths. The running length of clean air channel 11 is shorter than the running length of clean air channel 10. The running length of clean air channel 11 is indicated by the curved center line 13 and the running length of clean air channel 10 is indicated by curved center line 12. From the course of the center lines (12, 13), it can be seen that both clean air channels (10, 11) are redirected a number of times in the plane E or parallel thereto. Furthermore, both clean air channels (10, 11) have respective channel sections (35, 36) wherein the cross sections of the clean air channels (10, 11) taper starting from the inlet windows (25, 26) to the suction opening 5 (FIG. 5).

Referred to the up direction 14, the clean air channel 11 runs essentially above the longitudinal axis 6 while the clean air channel 10 runs essentially therebelow. Both clean air channels (10, 11) use essentially the entire width (b) (FIG. 2) of the intermediate base 7 and each uses approximately half the height (h) (FIG. 2).

As to the shape of the lower clean air channel 10, a wall tongue 19 is formed on the wall 17 of the intermediate base 7 and has a lower end 20. The wall tongue 19 projects beyond the wall 17. The clean air channel 10 is guided around the lower end 20 of the wall tongue 19. At the lower end 20, at least one, here, three hook-shaped hold-back edges 21 are formed for condensed fuel. Fuel, which is spat back from the carburetor 2 through the suction opening 5 (FIG. 1) into the clean air channel 10 and deposits on the wall tongue 19, runs along the wall 37 of the wall tongue 19 downwardly in the direction of gravity until it is held up by the hold-back edges 21. The fuel, which is collected there, can be taken up with higher flow speeds in the clean air channel 10 by the passing caressing intake air and supplied to the carburetor 2 (FIG. 1).

The lower clean air channel 10 is further delimited by a lower wall section 22 referred to the up direction 14. The fuel collection space 24 is arranged on the outer side of the lower wall section 22 and separate from the clean air channel 10. The fuel collection space 24 communicates via a breakthrough 23 in the lower wall section 22 with the clean air channel 10. In the fuel collection space 24, those fuel quantities can collect which condense out or deposit in the clean air channels (10, 11) and can no longer be supplied to the intake air flow. The fuel collecting space 24 can also be configured as an external vessel.

Furthermore, FIG. 4 shows that the connecting space 27 for the tank venting 28 (FIG. 1) is arranged directly next to the inlet window 25 and communicates in a flow-conducting manner with the clean air channel 10 via a connecting window 70.

In an advantageous embodiment, but also in an independent embodiment, at least one condensation rib (29, 30, 31, 32) is arranged running in flow direction in at least one clean air channel (10, 11). In the embodiment shown, a first pair of condensation ribs (29, 30) and a second pair of condensation ribs (31, 32) are formed. The condensation ribs (29, 30) in the tapering channel section 35 of the clean air channel 10 are arranged one next to the other while the further condensation ribs (31, 32) are arranged lying next to each other in the tapering channel section 36 of the clean air channel 11. Their course or curvature is so designed that they lie parallel to the undisturbed flow lines of the intake air flow in the clean air channels (10, 11). In this way, the respective intake air flows are not throttled. Nonetheless, the ribs form an enlarged surface on which back-spat fuel can collect or can condense out. The lowest condensation rib 29 referred to the up direction 14 has at least one hold-back edge 34 for condensed fuel at its lower end 33. This hold-back edge 34 corresponds with respect to its function to the above-described hold-back edges 21 of the wall tongue 19.

FIG. 5 shows the arrangement of FIG. 4 with a seated filter base 4. From FIGS. 4 and 5, it can be seen that the compensator passthrough 59 extends completely through the filter base 4 and the intermediate base 7 without being in flow-conducting connection with the clean air channels (10, 11). Furthermore, it is seen that the threaded nipple 63 lies in overlapment with the connecting space 27 and thereby establishes a flow-conducting connection.

An assembly flange 67 is formed in the wall 16 of the filter base 4 on the side thereof facing toward the carburetor 2 (FIG. 1). The assembly flange 67 surrounds the suction opening 5 and has two threaded-fastener openings 66 for connecting the channel case 58 (FIG. 2) to the carburetor 2 (FIG. 1) with threaded fasteners. The upper ends of the condensation ribs (29, 30) can be seen through the suction opening 5. From this, and from FIG. 4, it can be seen that the suction opening 5 does not lie in overlapment with the input windows (25, 26). Rather, the intermediate base 7 (FIG. 4) here has a wall section 18 which lies opposite the suction opening 5 referred to the longitudinal axis 6 thereof. Fuel, which can be spat back through the suction opening 5 under specific operating conditions, impinges first on the wall section 18 whereby this wall acts as an impact wall.

Furthermore, FIG. 5 shows that the condensation rib 29 extends into the channel wall 37 (shown in greater detail in FIG. 4) in the overlapment region with the suction opening 5. An outflow window 38, which faces toward the suction opening 5, is formed in the condensation rib 29 in the transition region between the condensation rib 29 and the channel wall 37 whereby intake air is conducted to the suction opening 5 in correspondence to arrow 71 in a flow-optimized manner.

In total, the configuration of the invention leads, with a small structural size, to the possibility of providing comparatively long clean air channels (10, 11) for matching the intake path to the running performance of the engine 39. At the same time, the back spitting problematic is reliably reduced. Fuel quantities, which are spat back into the clean air channels (10, 11) can either be supplied again to the intake air flow or be collected in a manner that they do not come into contact with the filter element 3.

It is understood that the foregoing description is that of the preferred embodiments of the invention and that various changes and modifications may be made thereto without departing from the spirit and scope of the invention as defined in the appended claims.

What is claimed is:

1. An air filter unit for a carburetor of a portable handheld work apparatus, the air filter unit comprising:
  a filter element for passing an intake air flow;

a clean air channel for conducting said intake air flow in a flow direction with said intake air flow defining undisturbed flow lines in said clean air channel;

said clean air channel being arranged between said filter element and said carburetor;

a condensation rib arranged in said clean air channel so as to extend in said flow direction; and, said condensation rib having a course configured so as to cause said condensation rib to lie parallel to said undisturbed flow lines in said clean air channel.

2. The air filter unit of claim 1, wherein said condensation rib is a first condensation rib and said air filter unit further comprises a second condensation rib; and, said first and second condensation ribs are disposed one next to the other in said clean air channel.

3. The air filter unit of claim 1, wherein said work apparatus has a usual working position in which the work apparatus is held during the operation thereof; said condensation rib lies downwardly in gravitational force direction referred to said usual working position and has a lower end; and, said condensation rib has a hold-back edge at said lower end for condensed fuel.

4. The air filter unit of claim 1, wherein said clean air channel extends from said filter element toward said carburetor; in a segment of said clean air channel, aid clean air channel has a cross section narrowing toward said carburetor; and, said condensation rib is arranged in said segment.

5. The air filter unit of claim 1, wherein said clean air channel is a first clean air channel and wherein said air filter element further comprises a second clean air channel separate from said first clean air channel.

6. The air filter unit of claim 5, wherein said first and second clean air channels have first and second lengths, respectively; and, said first and second lengths are different from each other.

7. The air filter unit of claim 1, wherein said filter element has a side facing toward said carburetor; and, wherein said air filter unit further comprises:

a filter base at said side of said filter element;

said filter base having a suction opening defining a longitudinal axis;

an intermediate base disposed between said filter element and said filter base;

said intermediate base and said filter base extending in a plane (E) transverse to said longitudinal axis;

said intermediate base having a sealing surface formed thereon;

said filter element having a peripherally-extending seal;

said intermediate base being larger in said plane (E) than said peripherally-extending seal;

said filter element lying against said sealing surface with said peripherally-extending seal;

said clean air channel being disposed between said filter base and said intermediate base so that an imaginary middle line of said clean air channel lies in said plane (E); and, said clean air channel opening into said suction opening.

8. The air filter unit of claim 7, wherein said filter base and said intermediate base extend in said plane (E) in an up direction with an elevation (h) and in a lateral direction with a width (b); said filter base and said intermediate base have respective walls which lie parallel to each other and to said plane (E) and which are at a distance (a) from each other; and, said elevation (h) and said width (b) are greater than said distance (a).

9. The air filter unit of claim 8, wherein said elevation (h) and said width (b) are at least twice as large as said distance (a).

10. The air filter unit of claim 8, wherein said elevation (h) and said width (b) are at least three times as large as said distance (a).

11. The air filter unit of claim 7, wherein said clean air channel is redirected several times in said plane (E).

12. The air filter unit of claim 7, wherein said intermediate base has a wall section which lies opposite said suction opening referred to said longitudinal axis thereof.

13. The air filter unit of claim 7, wherein said work apparatus has a usual working position in which the work apparatus is held during the operation thereof; and, said air filter unit further comprises a tongue-shaped wall section having a lower end lying downwardly in gravitational force direction referred to said usual working position; said tongue-shaped wall section is disposed along said clean air channel so as to guide said clean air channel around said lower end of said tongue-shaped wall section; and, said lower end has at least one hold-back edge formed thereon for condensed fuel.

14. The air filter unit of claim 7, further comprising a lower wall section in gravitational force direction delimiting a segment of said clean air channel; a fuel collecting space; and, said wall section having a breakthrough to said fuel collecting space.

15. The air filter unit of claim 7, wherein said clean air channel has an inlet window facing toward said filter element; wherein said air filter unit further has a connecting space next to said inlet window for a tank venting system; and, said connecting space has a flow-conducting connection to said clean air channel.

16. The air filter unit of claim 7, wherein said condensation rib and said suction opening conjointly define an overlapment region; said condensation rib passes into a channel wall in said overlapment region; and, said channel wall has an outflow window facing toward said suction opening.

17. An air filter unit for a carburetor of a portable handheld work apparatus, the air filter unit comprising:

a filter element for passing an intake air flow;

a clean air channel for conducting said intake air flow in a flow direction with said intake air flow defining undisturbed flow lines in said clean air channel;

said clean air channel being arranged between said filter element and said carburetor;

a condensation rib arranged in said clean air channel so as to extend in said flow direction;

said condensation rib having a course configured so as to cause said condensation rib to lie parallel to said undisturbed flow lines in said clean air channel;

said clean air channel defining a center line; and, said condensation rib running parallel to said center line.

* * * * *

UNITED STATES PATENT AND TRADEMARK OFFICE
CERTIFICATE OF CORRECTION

| | |
|---|---|
| PATENT NO. | : 8,277,527 B2 |
| APPLICATION NO. | : 12/656473 |
| DATED | : October 2, 2012 |
| INVENTOR(S) | : Sven Keller et al. |

It is certified that error appears in the above-identified patent and that said Letters Patent is hereby corrected as shown below:

In Column 9:
Line 25: delete "aid" and insert -- said -- therefor.

Signed and Sealed this
Eighth Day of January, 2013

David J. Kappos
*Director of the United States Patent and Trademark Office*